UNITED STATES PATENT OFFICE 3,033,686
Patented May 8, 1962

3,033,686
PLASTIC GELS OF WATER AND ACYL LACTYLIC ACIDS AND THEIR SALTS
Bert William Landfried, Independence, and Ralph J. Tenney, Kansas City, Mo., assignors to C. J. Patterson Company, Kansas City, Mo., a corporation of Missouri
No Drawing. Filed Oct. 21, 1959, Ser. No. 847,708
13 Claims. (Cl. 99—91)

This invention relates to a composition of acyl lactylic acids and their salts, and in particular is directed to a stable smooth textured and solid gel of said acyl lactylic acids and their salts, and the process of making the same.

The term lactylic acid is employed herein to designate both the monomeric as well as the polymeric lactic acids. The additives used in this invention are polylactic acid esters of fatty acids and their non-toxic salts, said esters having the formula RCO (OCHCH$_3$CO)$n$OH, wherein RCO is an acyl radical of a fatty acid containing from 16 to 24 carbon atoms and $n$ is the average number of lactylic groups present in such esters ranging from 1 to 4. The preparation, description and function of these esters and their salts are outlined in the Thompson et al. Patents Nos. 2,733,252; 2,744,825; 2,744,826; and 2,789,- 992. The preferred polylactic acid esters of fatty acids and their non-toxic salts of this invention taught by these patents are the saturated ones.

It is an object of this invention to produce these additives in a form more convenient to handle and more economical to use.

A further object of this invention is to provide an additive of this type which will enhance the quality of the finished baked product.

Still another object of this invention is to provide the additive in the form of a stable homogeneous plastic solid gel which can be used more effectively than a coarse liquid emulsion.

The physical properties of these additives, in their dry solid form, give rise to unique packaging, storage and handling problems. Within a narrow temperature range, they exhibit extreme physical characteristics. They usually melt above from 44 to 47° C. and tend to soften at temperatures somewhat below this range. At temperatures lower than 30° C., they become hard, brittle solids. The calcium salt form is prepared for commercial use by comminuting the compound in the cold state to a fine powder of less than 40 mesh, and is packaged in 100 pound drums having a moisture proof liner because these chemicals are midly hygroscopic. Comminution of the cold, hard, brittle solid is messy with an attendant loss of materials in the form of fine air-borne particles. Due to the relatively low melting points, softening points and slight hygroscopicity, problems of lumping and caking are frequently encountered during storage and distribution. In the caked state, these chemicals are difficult to handle, weigh and disperse in a bread dough. Because of their even greater tendency to lump and cake, neither the sodium salt nor acid form can be used conveniently in the powdered form.

Normally, in the bread industry, the desired quantity of such additives is weighed out in the powdered state and dispersed through each batch of bread dough. If the additive is lumped or caked when added to the bread dough, it will not mix well in the dough. The uneven distribution resulting therefrom will seriously limit the effectiveness of the additive on the finished baked product. U.S. Patent No. 2,744,825 discloses the use of a coarse, hot water, liquid emulsion as a means of adding the additives to the dough mix. For reasons of economy, such liquid emulsions are not practical for daily use in a commercial bakery.

This invention avoids the aforesaid drawbacks in the use of the acyl lactylic acids and their salts as bread additives, and greatly facilitates the handling, use and dispensing of these additives. According to this invention, these additives are combined with water to form stable plastic gels, the physical characteristics of which are new and unique in the art. When used in the making of bread, the gel form of the additive produces a substantial improvement in both bread quality and softness over the powdered or emulsified forms at comparable usage levels.

The following example illustrates the preparation and use of the plastic gels of these additives.

EXAMPLE

Separate mixtures of the calcium, sodium and acid forms of stearyl-2-lactylate and water were heated until the lactylates melted and then were vigorously agitated during cooling until the gel structure occurred. To assure uniformity, the mixtures were passed through a simple homogenizer until smooth-textured plastic solids resulted. This was also accomplished by dispersing the warmed components in a Waring blender. The gel can also be obtained by dispersing the lactylate with water in a Waring blender at room temperature. Stable opaque gels of this type were made containing varying amounts of water and lactylate with the following results:

| Percent Lactylate (by weight) | Percent Water (by weight) | Appearance of the Gel |
|---|---|---|
| 25 | 75 | About 5 cc. water separated. |
| 30 | 70 | Smooth, Plastic solid. |
| 40 | 60 | Do. |
| 45 | 55 | Slightly grainy and crumbly. |

The most ideal gel obtained, using the various forms of the additives, was the one with the composition Percent
Water _____ 60
Lactylate _____ 40

The functionality of the preferred form of the 40% lactylate plastic gels was evaluated by baking tests.

The chemical and physical properties of wheat flours vary over rather wide ranges because of the many factors which influence the wheat plant during growth. These environmental factors include temperature, rainfall, barometric pressure, wind velocity, humidity, proportion of sunshine during the growing season and soil properties such as mineral content, organic matter, texture, etc. These influences vary from one geographical location to another and change from season to season even in the same location. In addition, many hybrid varieties of wheat are produced which possess different inherent properties. All of these factors directly relate to the chemical and physical variations found in commercial wheat flours which the baker employs in the manufacture of baked products.

The flour miller exercises stringent surveillance over available wheat stocks and selects only those which fall within his specifications which will meet the requirements of the baking trade. Further, he maintains strict laboratory control over his wheat mixes as well as his milling procedure in order to keep these variables within the permitted ranges of tolerances.

Despite these control measures, flours supplied to the baker differ considerably in their properties and necessitate compensations in dough processing to minimize deviations from uniform standards in the baked products. Accordingly, the evaluation of effectiveness of dough ingredients is subject to variability, particularly when one considers that other variations occur in the breadmaking process itself. When the baking test is employed to measure the effectiveness of an ingredient, many replications must be made so that the conclusions drawn from the tests will bear proper statistical significance. The following is the baking test employed for this invention.

*Flour Analysis*

[Flour type—Southwestern type bakers patent]

| | | |
|---|---|---|
| Moisture | percent | 14.0 |
| Protein | do | 12.0 |
| Ash | do | 0.43 |
| Malt Index (amylograph) | B.U | 600 |
| Farinograph: | | |
| Absorption | percent | 60.0 |
| Peak time | minutes | 6.5 |
| Mechanical Tolerance Index | B.U | 45 |

Bread was prepared using the sponge-dough procedure containing the following percentages of ingredients based on total flour weight.

| Sponge: | Percentage of total flour |
|---|---|
| Flour | 70.0 |
| Lard | 2.0 |
| Yeast | 2.5 |
| Yeast food | 0.75 |
| Water | 37.5 |

Sponges were mixed three minutes in low speed (44 r.p.m.) in a cold water jacketed mixer. Temperature was controlled to produce a sponge temperature of 80° F. The sponge was then fermented for 4½ hours in a fermentation cabinet, held at a constant temperature of 80° F. and a relative humidity of 91%.

DOUGH

After the sponge fermentation, the remaining ingredients were added to the sponge and mixed 2 minutes in low speed and 4 minutes in high speed (88 r.p.m.). The dough side ingredients were:

| | Percentage of total flour |
|---|---|
| Flour | 30.0 |
| Corn sugar | 8.0 |
| Non fat milk solids | 3.0 |
| Salt | 2.0 |
| Water | 24.5 |

Again the temperature was held constant at 80° F. during mixing. After mixing, the dough was returned to the fermentation cabinet for 45 minutes floor time.

Following floor time, duplicate 19 ounce pieces were scaled from each dough, which produced a finished loaf weight of approximately one pound. These dough pieces were then rounded in a conventional rounder and given a 10 minute rest period prior to moulding which corresponds to overhead proof in a commercial shop. Pieces were then moulded in a conventional cross-grain moulder and panned. The dimensions of the baking pan used are as follows:

| | Inches |
|---|---|
| Top | 4.4 x 10.5 |
| Bottom | 3.75 x 9.75 |
| Depth | 3 |

The panned dough pieces proofed to an average height of one-half inch above the top of the pan in a proofing cabinet held at a constant temperature of 104° F. and a relative humidity of 80%. Upon reaching the desired height the panned dough was placed in a reel type oven and baked for 21 minutes at 430° F.

The bread was then taken from the oven, depanned and allowed to cool on a wire rack for 1 hour. After cooling, the bread was packaged in polyethylene bags, closed to form an air-tight seal and placed in a constant temperature and humidity cabinet at 73° F. and 50% relative humidity for storage. Compressibilities, using the standard laboratory procedures, were taken at the end of 48 hours, at which time the bread was scored or graded as to its quality.

Plastic gels of each of the three forms of the additive were added at various concentration levels to the dough stage of the bread doughs. Control doughs were also prepared without any of the lactylates, and others were made using the lactylates added according to the emulsion procedure disclosed in Patent No. 2,744,825. The calcium form was also added as a powder in the manner used commercially. All other factors were held constant. Each dough was baked into bread. Table I gives the results of these tests.

TABLE I

*Quality Score and Compressibility of Bread Prepared With Three Different Additives*

[Additive: Stearyl-2 Lactylic Acid]

| (Dry Basis) | Emulsion of Pat. No. 2,744,825 | | Plastic Gel | |
|---|---|---|---|---|
| | Score | Comp. | Score | Comp. |
| 0.3% | 83.8 | 135 | 84.4 | 159 |
| 0.5% | 84.3 | 147 | 85.3 | 188 |

[Additive: Sodium Stearyl-2 Lactylate]

| | Score | Comp. | Score | Comp. |
|---|---|---|---|---|
| 0.3% | 85.0 | 149 | 84.7 | 167 |
| 0.5% | 84.5 | 145 | 85.3 | 191 |

[Additive: Calcium Stearyl-2 Lactylate]

| (Dry Basis) | Emulsion of Pat. No. 2,744,825 | | Plastic Gel | | Powder | |
|---|---|---|---|---|---|---|
| | Score | Comp. | Score | Comp. | Score | Comp. |
| 0.3% | 84.3 | 146 | 84.8 | 150 | 84.3 | 142 |
| 0.5% | 85.0 | 153 | 85.3 | 170 | 85.0 | 145 |

| | Score | Comp. |
|---|---|---|
| Control (No Additive) | 83.8 | 131 |

The results thus obtained clearly indicate that the additive in the plastic gel form is superior functionally to the powdered or liquid emulsion forms used previously. Throughout the entire series of tests, the gels tended to produce bread with higher quality and greater crumb softness. Bread made with 0.3% of the plastic gel form of the additive was comparable to that made with 0.5% of compounds added according to the emulsion procedure described in Patent No. 2,744,825, or using the powdered form of the calcium salt. This data indicates that the plastic gel form is approximately 40% more effective than the emulsified or powdered form of the additive. Experience has shown that approximately the same effectiveness is obtained in bread made with all of the various types of flours used by commercial bakers. The maintenance of quality resulting from the use of less of the plastic gel form of the additive shows its functional advantage over the use of the additive in an emulsified or powdered form.

Chemical stability tests, based on acid values, were run to determine the relative chemical stability of the additive in the plastic gel form. A set of samples was prepared using a composition of 60% water and 40% calcium stearyl-2-lactylate. Samples of this mixture were stored for seven weeks at 100° F., room temperature, and at 35° F. Physically, the gel was stable and uniformly plastic at these temperatures at the termination of the test period. Acid values did not change significantly, as shown in Table II.

TABLE II

Chemical Stability Based on Acid Value (Dry Basis)

|  | Initially | After 11 Days | After 4 Weeks | After 7 Weeks |
|---|---|---|---|---|
| Plastic Gel: |  |  |  |  |
| (a) at room temperature | 109 | 108 | 119 | 119 |
| (b) at 100° F | 114 | 111 | 117 | 116 |
| (c) at 35° F | 111 | 109 | 107 | 106 |
| Powdered Additive | 98 | 98 | 105 | 107 |

Another set of samples was also prepared to test the relative stability of the three different chemical compositions of the additive, that is, the calcium, sodium and acid forms. Plastic gels of each of the three chemical compositions were prepared and stored at room temperature over a four-week period. The acid values on these samples were determined weekly as an index of their possible changes in chemical composition. All these gels were physically stable at the end of the four-week test period and showed no significant changes in acid value, as shown in Table III.

TABLE III

Acid Values at Room Temperature

|  | Powdered Form, Initially | Plastic Gel Form | | | |
|---|---|---|---|---|---|
|  |  | 7 Days | 14 Days | 21 Days | 28 Days |
| Calcium Stearyl-2-Lactylate | 142 | 146 | 144 | 146 | 148 |
| Sodium Stearyl-2-Lactylate | 110 | 110 | 117 | 115 | 125 |
| Stearyl-2-Lactylic Acid | 214 | 197 | ------ | 193 | 200 |

The results shown in Tables II and III indicate the plastic gels are chemically stable for relatively long periods of time over a temperature range of from 35 to 100° F. Variations in acid values were well within the range of variability considered normal for the various forms of lactylate.

Having now described the means by which the objects of the invention are obtained,

We claim:

1. A composition comprising a smooth-textured homogeneous plastic-solid gel stable at room temperature and essentially consisting of 60 to 70% by weight of water and 40 to 30% of fatty acid lactylate composition selected from the group consisting of fatty acid lactylates having the general formula RCO (OCHCH$_3$CO)$n$OH, where RCO is the acyl radical of a saturated fatty acid containing from 16 to 24 carbon atoms and $n$ is the average number of lactylic groups ranging from 1 to 4, and their non-toxic salts.

2. A composition as in claim 1 in which the amount of water in said gel is about 60% by weight and the amount of fatty acid lactylate composition is about 40%.

3. A process for the production of a smooth-textured homogeneous plastic-solid gel system stable at room temperature and consisting essentially of water and a fatty acid lactylate composition selected from the group consisting of fatty acid lactylates having the general formula RCO (OCHCH$_3$CO)$n$OH, where RCO is the acyl radical of a saturated fatty acid containing from 16 to 24 carbon atoms and $n$ is the average number of lactylic groups ranging from 1 to 4, and their non-toxic salts, comprising mixing 60 to 70 parts by weight of water with 40 to 30 parts by weight of said fatty acid lactylate composition with at least some agitation until said plastic-solid gel system is formed.

4. A process as in claim 3 in which said water and said fatty acid lactylate composition are mixed at elevated temperatures until said composition melts, and then cooling and simultaneously agitating said mixture until said plastic-solid gel system is formed.

5. A process as in claim 3 in which 60 parts by weight of water are mixed with 40 parts by weight of said fatty acid lactylate composition.

6. A composition comprising a smooth-textured homogeneous plastic-solid gel stable at room temperature and essentially consisting of 60 to 70% by weight of water and 40 to 30% by weight of a fatty acid lactylate composition selected from the group consisting of stearyl lactylates having the general formula RCO (OCHCH$_3$CO)$n$OH where RCO is a stearic acid acyl radical and $n$ is the average number of lactylic groups ranging from 1 to 4, and their non-toxic salts.

7. A composition comprising a smooth-textured homogeneous plastic gel stable at room temperature and essentially consisting of 60 to 70% by weight of water and 40 to 30% of calcium stearyl-2-lactylate.

8. A composition comprising a smooth-textured homogeneous plastic-solid gel stable at room temperature and essentially consisting of 60 to 70% by weight of water and 40 to 30% of sodium stearyl-2-lactylate.

9. A composition comprising a smooth-textured homogeneous plastic-solid gel stable at room temperature and essentially consisting of 60 to 70% by weight of water and 40 to 30% of stearyl-2-lactylic acid.

10. A process for the production of a smooth-textured homogeneous plastic-solid gel stable at room temperature and consisting essentially of water and a fatty acid lactylate composition selected from the group consisting of stearyl lactylates having the general formula RCO (OCHCH$_3$)$n$OH where RCO is a stearic acid acyl radical and $n$ is the average number of lactylic groups ranging from 1 to 4, and their non-toxic salts, comprising mixing 60 to 70 parts by weight of water with 40 to 30 parts by weight of said stearyl lactylate composition with at least some agitation until said plastic-solid gel is formed.

11. A process for the production of a smooth-textured homogeneous plastic-solid gel stable at room temperature and consisting essentially of water and calcium stearyl-2-lactylate comprising mixing 60 to 70 parts by weight of water with 40 to 30 parts by weight of calcium stearyl-2-lactylate with at least some agitation until said plastic-solid gel is formed.

12. A process for the production of a smooth-textured homogeneous plastic-solid gel stable at room temperature and consisting essentially of water and sodium stearyl-2-lactylate comprising mixing 60 to 70 parts by weight of water with 40 to 30 parts by weight of sodium stearyl-2-lactylate with at least some agitation until said plastic-solid gel is formed.

13. A process for the production of a smooth-textured homogeneous plastic-solid gel stable at room temperature and consisting essentially of water and stearyl-2-lactylic acid comprising mixing 60 to 70 parts by weight of water wtih 40 to 30 parts by weight of stearyl-2-lactylic acid with at least some agitation until said plastic-solid gel is formed.

References Cited in the file of this patent

UNITED STATES PATENTS

| 2,744,825 | Thompson et al. | May 8, 1956 |
| 2,789,992 | Thompson et al. | Apr. 23, 1957 |
| 2,895,879 | Brokaw et al. | July 21, 1959 |

OTHER REFERENCES

The Journal of the American Oil Chemists' Society, January 1958 issue, vol. XXXV, No. 1, pages 49–52.